United States Patent [19]

Rossum, Jr.

[11] Patent Number: 5,013,105
[45] Date of Patent: May 7, 1991

[54] SCREWLESS ELECTRONIC INSTRUMENT ENCLOSURE

[75] Inventor: John R. Rossum, Jr., San Jose, Calif.

[73] Assignee: E-mu Systems, Inc., Scotts Valley, Calif.

[21] Appl. No.: 467,133

[22] Filed: Jan. 19, 1990

[51] Int. Cl.$^5$ .............................................. A47B 47/00
[52] U.S. Cl. .................................... 312/263; 312/257.1
[58] Field of Search ............................ 312/257.1, 263; 220/4 E, 4 F, 4 R; 206/321

[56] References Cited

U.S. PATENT DOCUMENTS

| | | | |
|---|---|---|---|
| 2,431,351 | 11/1947 | Stiriss | 220/4 R |
| 3,672,531 | 6/1972 | Balven | 220/4 R |
| 4,089,464 | 5/1978 | Teti, Jr. et al. | 220/4 A |
| 4,560,079 | 12/1985 | Eddleston et al. | 220/4 R |
| 4,585,122 | 4/1986 | Stegenga | 220/4 E |
| 4,652,969 | 3/1987 | Stegenga | 220/4 F |
| 4,874,210 | 10/1989 | Carroll | 312/257.1 |

Primary Examiner—Joseph Falk
Attorney, Agent, or Firm—Flehr, Hohbach, Test, Albritton & Herbert

[57] ABSTRACT

The enclosure is intended, among other uses, for a rack-mounted electronic musical instrument characterized in that screws are not required to secure the assembled parts of the enclosure. Top and bottom molded plastic halves (preferably identical) have integral flexible hooks and also projections. The halves have inward turned edges which fit together and mate at the horizontal mid-plane of the enclosure. A generally U-shaped thin, narrow sheet metal core engages the back and both sides of both halves inside the edges of the halves and is formed with holes into which the distal ends of the hooks snap and thus lock the halves and core together. A plastic front panel also has horizontal flexible hooks which snap into holes in the core to close off the front of the enclosure. Outward extending ears on the core may be used to attach the enclosure to a rack.

18 Claims, 3 Drawing Sheets

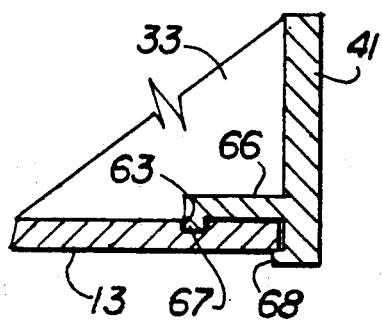
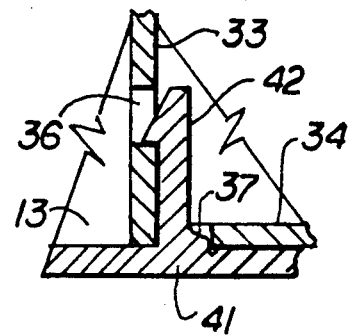
Fig.6　　　Fig.7
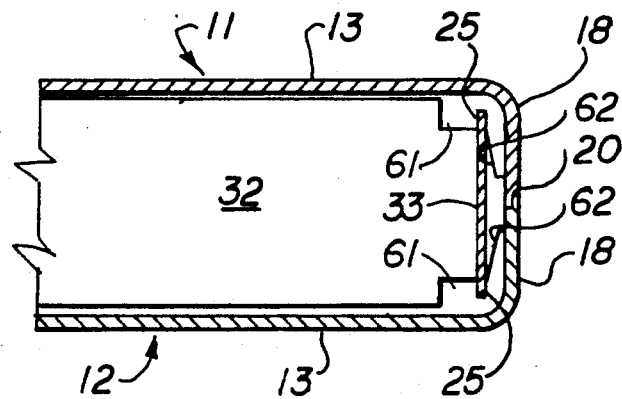
Fig.8

SCREWLESS ELECTRONIC INSTRUMENT ENCLOSURE

BACKGROUND OF THE INVENTION

1. Field of the Invention

This invention relates to a new and improved rack mounted electronic musical instrument enclosure characterized by the fact that it is composed of molded plastic top and bottom halves meeting along a horizontal mid-plane secured relative to each other by a core. A front panel closes off the front of the enclosure and is also secured to the core.

2. Prior Art

Enclosures for electronic musical instruments which are rack mounted have heretofore been made of metal. The metal is more expensive than plastic and furthermore requires the use of screws or bolts to hold the parts better together. The present invention eliminates the disadvantage of prior metal enclosures.

SUMMARY OF THE INVENTION

The principal object of the invention is to provide an enclosure of plastic which is less expensive than metal but does not compromise the strength, durability and appearance of conventional metal enclosures. Essentially the enclosure comprises four pieces. Two of three are preferably identical rectangular molded plastic top and bottom having inward turned edges along the back and both sides, the inner lips of the edges meeting along a common horizontal mid-plane, the lips being rabbetted in a manner to interfit to form a tight joint.

A sheet metal U-shaped core lines the back and sides of both the top and bottom, being formed with holes positioned to receive the barbed distal ends of flexible hooks formed integral with the top and bottom and extending inward parallel to the back and side edges. Thus the top and bottom are latched to the core and relative to each other. They may be disengaged by pushing the barbs inward so that they disengage from the core.

A front control panel closes off the front of the enclosure, having inward extending horizontal hooks which latch into holes in the sides of the core in the same manner as the hooks of the top and front. Further, the front panel has pairs of inward extending projections at top and bottom which latch into depressions formed in the inside surfaces of the top and bottom, providing additional locking means to secure the front panel in place. The U-shaped core preferably has outward extending ears which are immediately inward of the outer ends of the front panel. The ears are used to bolt the enclosure to a rack, there being aligned holes in the front panel and ears for passage of screws or bolts for such purpose.

Thus the top, bottom, core and front panel may be secured in place without the use of separate fasteners, such as screws and bolts.

The parts may be disassembled by pushing the barbs of the hooks out of the holes in the core in which they have latched.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is an enlarged fragmentary sectional view through a portion of an interlock of the front panel and bottom, the section through the bottom being taken substantially along line 6—6 of FIG. 2.

FIG. 7 is an enlarged fragmentary sectional view through a portion of an interlock of the front panel and the core.

FIG. 8 an enlarged fragmentary sectional view through a portion of an interlocked top, bottom and core, the section through the bottom being taken substantially along the line 8—8 of FIG. 2.

DETAILED DESCRIPTION OF THE PREFERRED EMBODIMENTS

Figure 1:
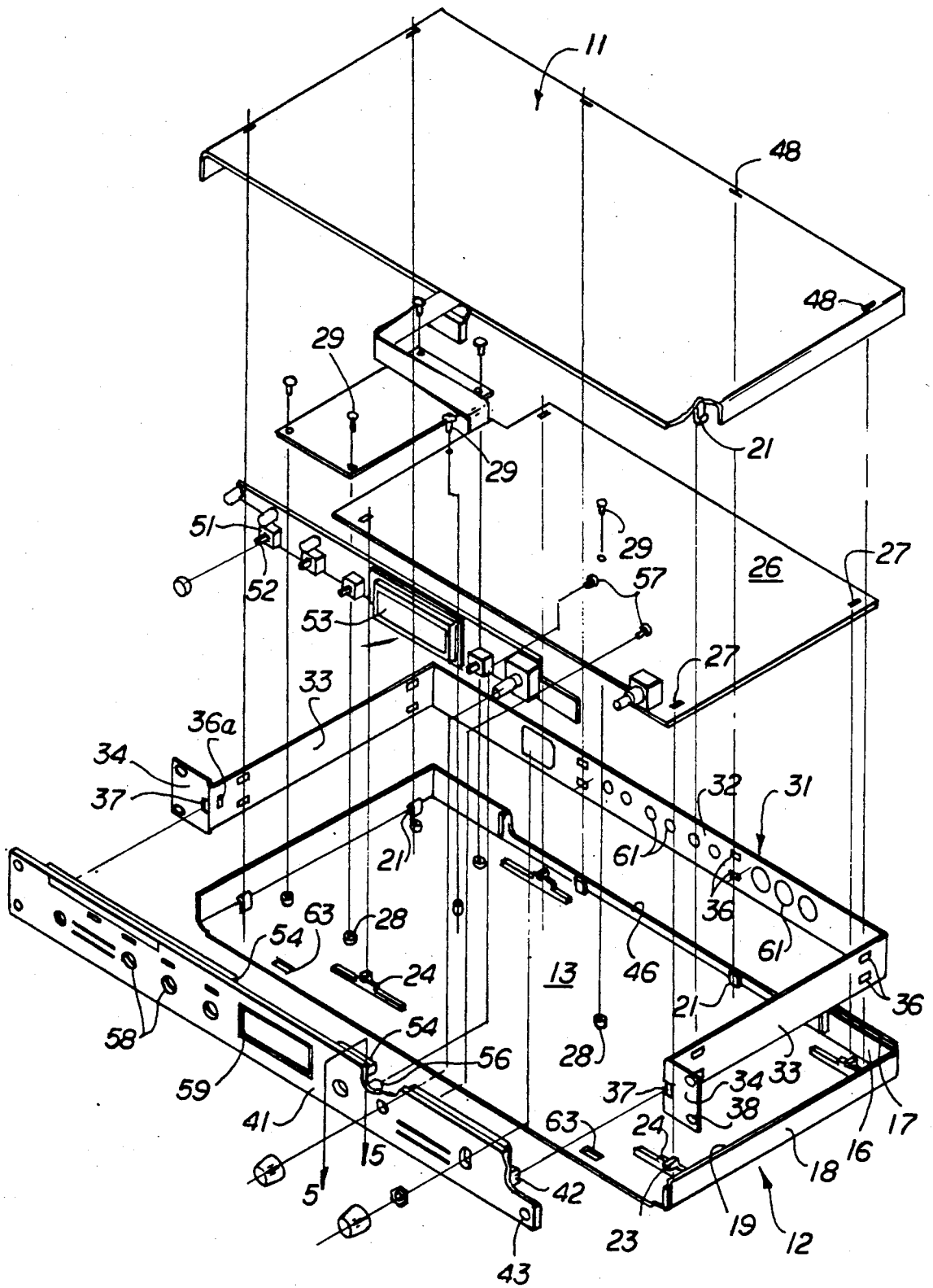
FIG. 1 is an exploded perspective view of the enclosure.
Figure 2:
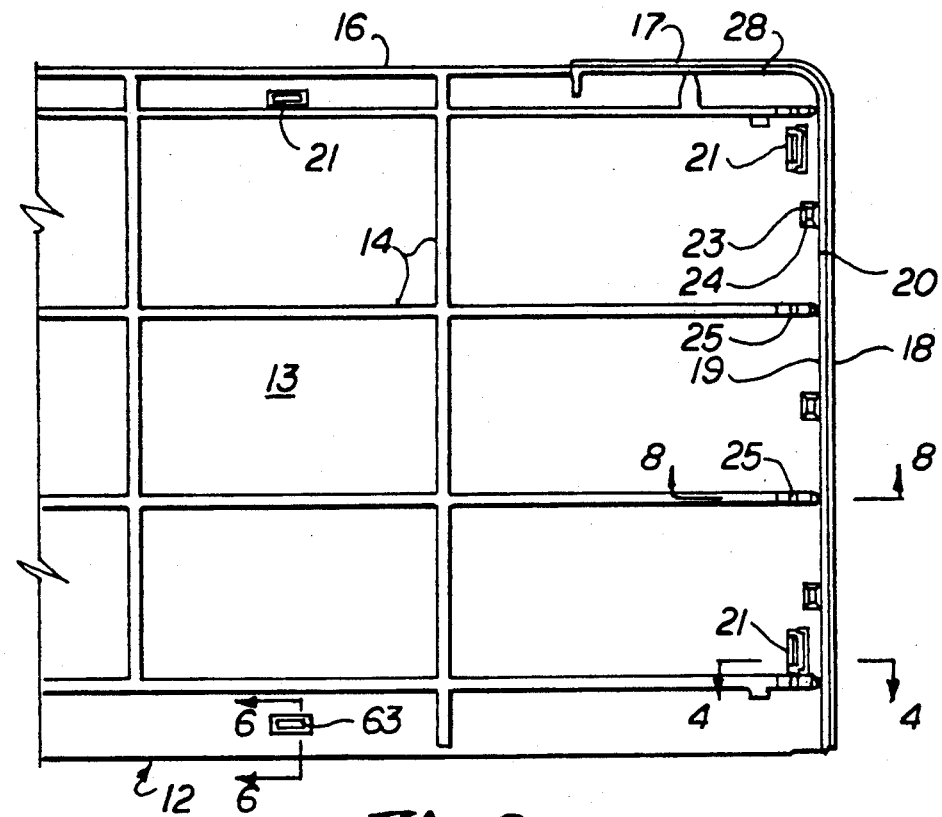
FIG. 2 is an enlarged fragmentary plan view of the bottom.
Figure 3:
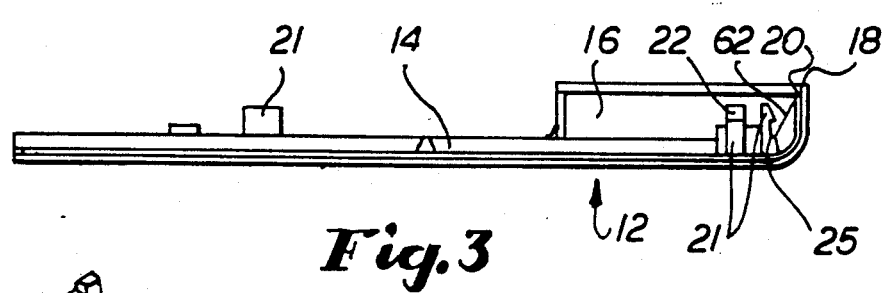
FIG. 3 is a fragmentary elevational view of the bottom.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The enclosure has a top 11 and a bottom 12 which are preferably identical in structure making it possible to form the same from a single mold. As has been stated, the top and bottom 11, 12 are formed of a molded plastic material which is preferably somewhat flexible. Since the top and bottom are identical only the bottom 12 will be hereinafter illustrated and described.

Bottom 12 is composed of a central generally rectangular panel 13 reinforced by an internal grid of reinforcing ribs 14. Along the back of bottom 12 is an upstanding back edge 16 terminating in a horizontal top lip 17. Preferably back edge 16 is partially cut away in a window 46. Side edges 18 extend up along either side of the central panel 13, merging in rounded corner where they join the back edge 16. Edges 18 also have an upper lip 19 co-planar with lip 17. Lips 17 and 19 are formed rabbetted in that a depression 20 is formed on the left side of bottom 13 on the inside and depression 20 is formed on the outside of the right side of bottom 13. As best shown in FIG. 8, when top 11 and bottom 12 interfit, the oppositely rabbetted lips interfit to form a tight seam. The central portion of edge 16 is preferably relieved in a window 46.

Vertically disposed detent hooks 21 are integrally molded with the central panel 13 and extend parallel to edges 16, 18 and spaced slightly inward therefrom. The hooks 21, are somewhat flexible by reason of the flexible material of which the top and bottom are molded. At their distal ends are outward extending barbs 22 which are approximately rectangular in cross-section. The function of the hooks 21 is hereinafter explained. There are preferably two hooks spaced in from back edge 16 and two hooks spaced inward from each side edge 18.

Notches 25 are formed adjacent the outer ends of ribs 14 and locating inward projections 61 are formed inward of notches 25. The ribs 14 slant in upward-outward stretches 62. These features assist the nesting of the edges of core 31 in the top and bottom, as best shown in FIG. 8.

Depressions 63 are formed in the inside surfaces of central panel 13 to receive hooks formed on front panel 41.

At appropriate locations extending up from the inside of central panel 13 are projections 23 having shoulders 24. The electronic components of the instrument are mounted on a circuit board 26 formed with rectangular holes 27 which receive the distal ends of the projections 23 and fit upon the shoulders 24, thereby locating the circuit board 26 relative to top and bottom 11, 12. Panel 13 is formed with tapped bosses 28 at the level of shoulders 24 so that screws 29 fitting through holes in the board 26 may detachably secure board 26 in place.

Various components 51 having stems 52 are located on or attached to board 26. Further, indicators 53 are likewise mounted on board 26.

A sheet metal core 31 is provided formed of relatively thin narrow metal such as cold rolled steel, the vertical height of the core 31 preferably being approximately twice the height of the back edges 16 and side edges 18. The core 31 is preferably generally U-shaped, having a back 32 of the same length as back edge 16 and sides 33 approximately the same length as the sides 18. Outward extending ears 34 are formed at the front edges of sides 33.

The bottom edges of sides 33 are guided into place in notches 25 by slanted stretches 62 and are held against inward displacement by projections 61.

Figure 4:
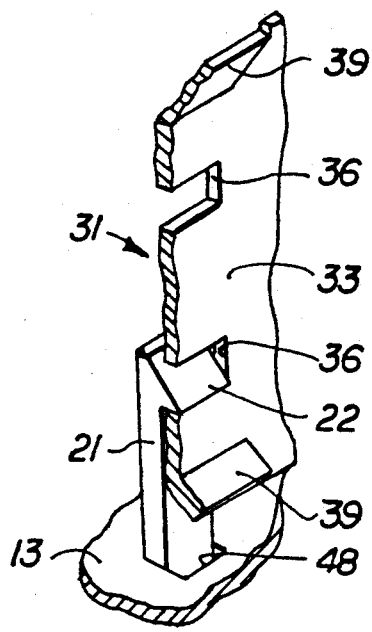
FIG. 4 is an enlarged fragmentary perspective view showing interlock of the bottom and the core, the section through the bottom being substantially along the line 4—4 of FIG. 2.
Figure 5:
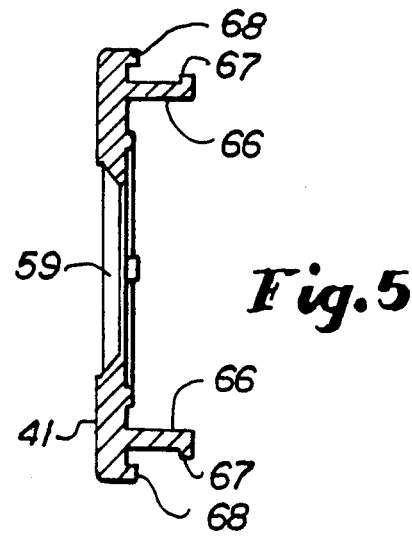
FIG. 5 is an enlarged sectional view through the front panel taken substantially along line 5—5 of FIG. 1.

Rectangular holes 36 are formed in back 32 and sides 33 at appropriate locations to receive the barbs 22 of the hooks 21. Thus there are two vertically spaced holes 36 to receive the corresponding hooks 21 of the top and bottom. The top and bottom edges of back 32 and sides 33 in alignment with holes 36 are formed with outward directed guides 39 to assist in flexing hooks 21 inward during assembly. See FIG. 4. The ears 34 are formed at the corner where their inner edges join the sides 33 with rectangular holes 37 for a purpose which hereinafter appears. Furthermore, bolt holes 38 are formed in ears 34 to attach the ears to a metal rack.

Front panel 41 is of a height equal to the combined height of top 11 and bottom 12 and is of a length equal to the distance between the outer edges of the ears 34. The inside of panel 41 is formed with horizontal hooks 42 similar in structure to vertical hooks 41. The hooks 42 fit through the holes 37 outside of sides 33 and snap inward into holes 36a adjacent the forward edges of sides 33. There are bolt holes 43 formed in front panel 41 which align with holes 38 for passage of the bolts or screws which mount the instrument on a rack.

As shown in FIG. 6, at two places near the bottom edge and two places near the top edge (not shown), panel 41 has inward extending projections 66 formed with detents 67 which snap into depressions 63. The lower (and upper) edges of panel 41 have trapping lips 68 which fit under the edge of panel 16. This arrangement locks panel 41 to top 11 and bottom 12.

Panel 41 has inward extending ledges which fit under the front edges of board 26. Further, the inside of panel 41 has tapped bosses 56 to receive screws 57 to secure components on board 26 to panel 41. Holes 58 may be formed in panel 41 to receive stems 52 so that external control knobs (not shown) may be attached thereto. Windows 54 in panel 41 line up with indicators 53 so that the indicators may be read from the exterior of the closure.

Apertures 61 of various shapes and sizes are formed in back 32 so that wires may be inserted into window 46 and then apertures 61 for connection to the various components on the board 26.

ASSEMBLY

The core 31 is first assembled on bottom 12, with sides 33 fitting against side edges 18 and back 32 fitting immediately inside back edge 16. The edge of core 31 is guided into notches 25 by slanted stretches 62 and held by projections 61. The barbs 22 of the hooks 21 snap into the lower holes 36 formed in the sides and back of the core 31. Slanted stretches 62 cause hooks 21 to flex inward allowing the barbs 22 to clear core 31. The circuit board 26 is then installed, the projections 23 fitting through the holes 27 and the board resting on the shoulders 24. Screws 29 attach board 26 to bosses 28.

Front panel 41 is then installed, the hooks 42 fitting through the holes 37 in the ears 34 and latching into the holes 36a near the forward edges of the sides 33. Screws 57 attach components to bosses 42 and stems 52 fit through holes 58. The detents 67 snap into depressions 63.

Top 11 is finally installed, its hooks 21 latching into the upper of the sets of holes 36.

To disassemble the enclosure, disassembly slots 48 are formed in panels 13 through which a blade may be inserted to disengage the hooks 21 from the holes 36.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:
1. An enclosure comprising:
   a plastic top portion,
   a plastic bottom portion,
   at least one said portion having an integral upstanding back edge along at least a part of the back of said one portion and integral side edges along at least parts of the sides of said one portion, said back and side edges having inner lips which are co-planar,
   a plurality of substantially vertical, flexible first and second hooks integral with and extending approximately perpendicular to said portions, said first hooks being spaced inward relative to said back edge and said second hooks being spaced inward relative to said side edges of said portions, said hooks having outward directed distal barbs,
   a U-shaped core, said core being formed of sheet metal and having a core back disposed inside of and parallel to and in proximity to said back edge and outside said first hooks and two core sides disposed inside of a parallel to and in proximity to said side edges and outside said second hooks dimensioned so that said core back fits between said back edge and some of said hooks and said core sides fitting between said side edges and some of said hooks, said core being formed with a plurality of first holes shaped and positioned to receive the barbs of said hooks to latch said top portion and bottom portion to said core and relative to each other, and said top and bottom portions meeting along opposed surfaces and forming an enclosure closed at the top, bottom back and two sides.

2. An enclosure according to claim 1 in which further comprises a front panel across and closing off the front edges of said top and bottom portions, said front panel having at least one inward extending horizontal third hook on each side of said enclosure formed with inward directed distal second barbs, said core being formed with second holes shaped and positioned to receive said second barbs to latch said front panel to said core and relative to said top and bottom portions.

3. An enclosure according to claim 2 in which said core sides are formed in the outward directed ears, said front panel having outer ends overlying said ears, said front panel and ears being formed with aligned bolt holes whereby said enclosure may be fastened to a rack.

4. An enclosure according to claim 3 in which said ears are formed with third holes for passage of said third hooks.

5. An enclosure according to claim 1 whereby at least one said portion is formed with a disassembly slot vicinal at least one said hook, whereby a blade may be inserted through said slot to bend said hook to disengage said barb from said hole.

6. An enclosure according to claim 1 which further comprises a board shaped to fit within said enclosure and formed with a plurality of projection-receiving holes, said portions being formed with projections spaced and dimensioned to fit into said projection-receiving holes whereby said board is located in place within said enclosure.

7. An enclosure according to claim 6 in which said projections are formed with shoulders supporting said board.

8. An enclosure according to claim 6 in which said board carries adjustable components having stems and said front panel is apertured to receive said stems.

9. An enclosure according to claim 8 in which said core back is formed with an aperture and said rear edge of said portion is formed with a window for access to said board through said aperture in said core back.

10. An enclosure according to claim 1 in which said top portion and said bottom portion are molded from common mold and are substantially identical, the inward facing extremities of said edges meeting at a horizontal mid-plane.

11. An enclosure according to claim 10 in which the height of said core is approximately twice the height of one of said side edges and said portions are formed with locating lips to receive the top and bottom edges of said core.

12. An enclosure according to claim 10 in which said inward facing extremities are rabbetted by forming grooves in said extremities, the grooves on one half of each said portion being formed on the outside and the grooves on the other half are formed on the inside, whereby when said portions are assembled said rabbetted extremities interfit to form a tight seam.

13. An enclosure according to claim 2 in which said front panel is formed with a plurality of inward protections having detents on their distal ends, at least one of said top and bottom portions being formed with depressions on their inner surfaces positioned to receive said detents to latch said front panel to said one portion.

14. An enclosure according to claim 13 in which said front panel is formed with an inward extending trapping lip to catch the forward outside edge of at least one of said top and bottom portions.

15. An enclosure according to claim 1 in which said core is formed on at least one of its top and bottom edges with outward slanted guides in alignment with said holes, whereby as said barbs contact said slanted guides said hooks are biased inward until said barbs snap into said holes.

16. An enclosure according to claim 1 in which said portions are formed with internal ribs, said ribs being formed with notches positioned to receive the top and bottom edges of said core.

17. An enclosure according to claim 16 in which at least one said rib outwardly of said notch is slanted outwardly along said side edge, said slanted rib guiding the edge of said core into said notch.

18. An enclosure according to claim 17 in which at least one said rib is formed with an upstanding projection inward of said notch to reinforce said core against inward displacement.

* * * * *